United States Patent [19]
Kreis et al.

[11] 3,874,633
[45] Apr. 1, 1975

[54] SEPARABLE VALVE COCK AND SEPARABLE STRUCTURE THEREFOR

[75] Inventors: Walter Kreis; Paul Trösch, both of Schaffhausen, Switzerland

[73] Assignee: Georg Fischer AG, Schaffhausen, Switzerland

[22] Filed: Aug. 14, 1973

[21] Appl. No.: 388,156

[30] Foreign Application Priority Data
Aug. 24, 1972 Switzerland.................... 12531/72

[52] U.S. Cl................ 251/214, 137/375, 277/167.5, 251/367
[51] Int. Cl............................................. F16k 41/04
[58] Field of Search.......... 251/172, 214, 306, 315, 251/367; 137/375; 277/167.5, 206.1

[56] References Cited
UNITED STATES PATENTS

| | | | |
|---|---|---|---|
| 2,954,264 | 9/1960 | Tisch et al. | 277/206.1 |
| 3,073,336 | 1/1963 | Johnson | 251/367 X |
| 3,095,177 | 6/1963 | Muller | 251/306 X |
| 3,211,420 | 10/1965 | Hartmann | 251/172 X |
| 3,336,939 | 8/1967 | Freed et al. | 137/375 |
| 3,729,170 | 4/1973 | Lewis et al. | 251/315 |

*Primary Examiner*—Martin P. Schwadron
*Assistant Examiner*—David R. Matthews
*Attorney, Agent, or Firm*—Flynn & Frishauf

[57] ABSTRACT

To effect perfect sealing of the spindle of a globe valve passing through separable halves of the housing of the valve, the housing, or the seal are so arranged that radial pressure is exerted by the seal against the valve spindle in the region where the seal, and the separable halves of the housing meet, so that radial pressure from the fluid within the valve, in the direction of the seal, and tending to leakage, is counteracted. This inwardly directed radial pressure can be obtained by an accumulation of material on the seal, on the housing, a decrease in the groove depth, in which the seal fits, or the like.

9 Claims, 6 Drawing Figures

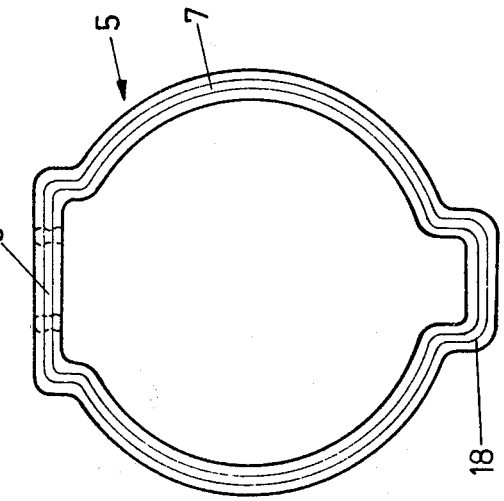
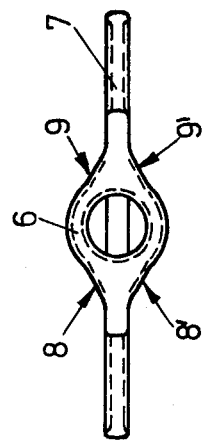
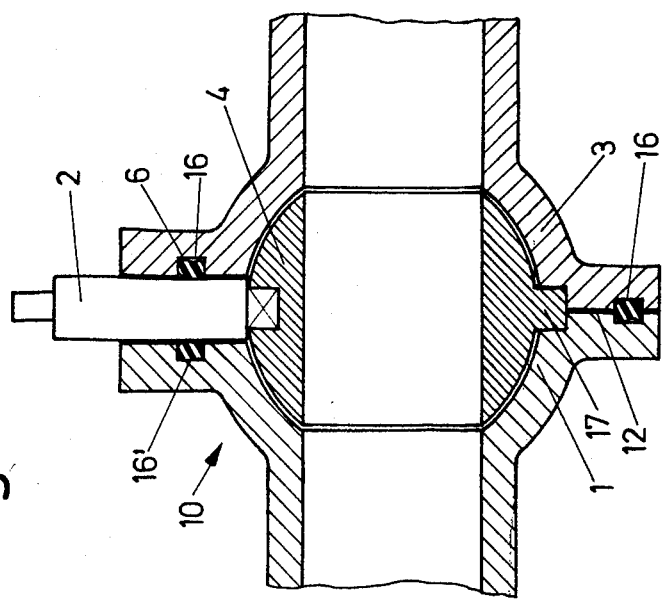

SEPARABLE VALVE COCK AND SEPARABLE STRUCTURE THEREFOR

The present invention relates to a valve cock, and more particularly to such a construction in which two housing halves are provided, which are sealed together by means of an elastic seal; the seal itself includes a ring portion surrounding a spindle through which the operating part of the valve passes, to operate the valve, the sealing member itself being located in grooves formed in the housing halves of the valve.

Separable valve cock housings have been previously proposed (see, for example, German Utility Model Pat. No. 1,773,610) in which a sealing ring surrounds a spindle, the sealing ring being formed as a unitary element with an opening through which the spindle passes. The sealing element itself is located in grooves formed in the housing halves. Such a construction is particularly applicable to globe valves. It has been found that the elastic deformation which results due to pressure within the valve housing affects the sealing efficiency of the seal, particularly in the region surrounding the spindle, so that tightness of sealing about the spindle cannot be ensured. The internal pressure within the valve effects dynamic sealing (due to the deformation of the seal), but this internal pressure acts on the elastic sealing element also in directions radially with respect to the spindle, that is, in a direction in which there is no metal part of valve housing to accept the pressure, but rather only additional sealing material. At those points where the housing seal merges with the ring-shaped portion of the seal surrounding the spindle, radial outward pressure is exerted against the spindle seal ring, which is not counteracted by a metal back-up, so that the seal around the spindle is interfered with in its operation and may tend to leak.

It is an object of the present invention to provide a valve construction, particularly for globe valves, having separable housing, in which sealing problems surrounding the operating spindle of the valves, are avoided.

Subject matter of the present invention

Briefly, the seal, or the housing, or both, are so constructed that radial, inwardly directed pressure, toward the spindle, will occur at the transition zone between the neck portion of the seal, and the ring portion thereof, fitted in grooves of the housing halves, this pressure applying a bias force having a component acting on the seal, or sealing gasket in a direction parallel to the plane of the mating surfaces of the housing halves, so that a force component will be available to counteract internal pressure arising within the valve.

In accordance with features of the invention, the forces may be generated by providing additional material at the transition zone, for example in the valve housing, in the sealing element itself, or both, or, for example, when a seal is fitted in grooves, by making the grooves less deep at the specific zones. The transition region, in accordance with a feature of the invention, may be wedge shaped, with the wedge being directed towards the spindle, so that force vectors, or force components will arise directed radially inwardly to counteract internal pressure within the valve.

In accordance with another feature of the invention, a seal is provided which is essentially ring shaped, the seal having a transverse circular opening to permit passage of a spindle therethrough and an extra accumulation of material surrounding the opening in the zone where the seal material merges with ring shaped portion thereof, to provide said inwardly directed force when a seal is assembled in a valve.

The invention will be described by way of example with reference to the accompanying drawings, wherein:

FIG. 1 is a longitudinal transverse sectional view of a globe valve, having two housing halves, with a sealing gasket inserted;

FIG. 2 is a side view of a sealing gasket itself;

FIG. 3 is a top view of the sealing gasket, and illustrating the transition zones from sealing portion for the spindle to sealing portion of the housing halves;

Figure 4:
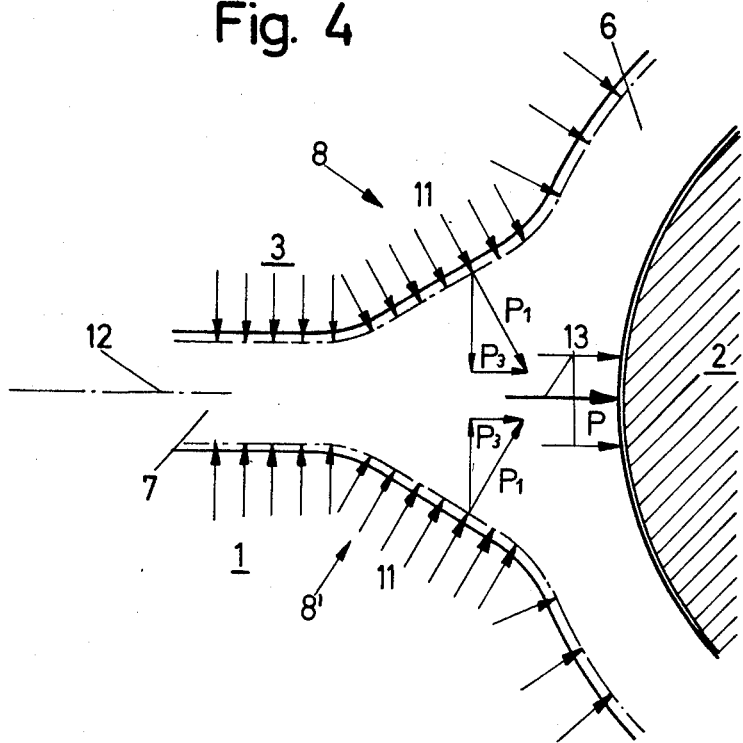
FIG. 4 is a greatly enlarged fragmentary top view of the seal, and illustrating force relationships.

A globe valve 10 of known construction, and having separable housing halves 1, 3, encloses therein a valve globe element 4, which is operated by means of a spindle 2 passing through the housing halves. The spindle and the housing halves are sealed together by means of a seal 5 (FIG. 2). The housing halves are joined together along mating surfaces 12, and held in tightly compressed, matching position by suitable means (not shown) for example clamping screws, or the like.

The sealing element 5 itself is unitary and has two separate portions: a spindle sealing ring 6, which, when assembled, surrounds spindle 2; and a unitary housing seal 7, to provide a gasket and a seal for the two housing halves 1, 3. The planes in which the portions 6, 7 are located are perpendicular to each other. A transition zone 8, 8', 9, 9' (FIG. 3) is located between the spindle portion 6 and the housing sealing portion 7.

The force relationships, and the transition zones 8, 8' are illustrated in FIG. 4. Let it be assumed that the housing halves 1, 3, are assembled together and clamped against each other; the sealing element 5 is located in grooves formed in the housing halves. Clamping the housing halves with respect to each other will result in forces $P_1$, as indicated by arrows 11, acting on the transition zone 8, 8'. Each one of the forces $P_1$, acting in the direction of arrows 11 against the transition zone 8,8' results in a force component $P_3$, the summed components $P_3$ resulting in main forces P, acting on the spindle 2, in the direction of arrow 13, thus in the direction of the separating plane 12, between the housing halves 1, 3. The transition zones 8, 8' are formed by an increase, or accumulation of material of the sealing gasket itself and/or an accumulation of material on the housing halves, resulting in the forces acting in a direction 11 which will then provide a component acting in the direction of arrows 13. This ensures a reliable seal, even against pressure in a radial direction, that is, from between spindle 2 acting on the seal ring 6 in a direction counter the arrows 13, in the plane 12. The spindle 2 is thus sealed effectively throughout its circumference.

Figure 5:
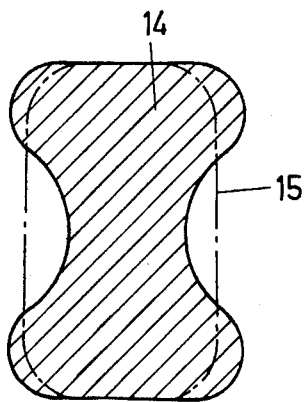
FIG. 5 is a sectional view through the seal, in enlarged representation, illustrating a preferred form of the shape of a sealing gasket.

The cross-sectional shape of the gasket is seen in FIG. 5, when in unstressed form. Preferably, the profile 14 is formed with a double constriction, to leave four projecting end portions; such a profile is known also as a quad-ring. When a gasket of such profile is placed in grooves, and then under pressure, then the profile as illustrated by the cross hatched area will deform to obtain the profile within the chain dotted line 15, and thus provide smooth uniform fitting of the gasket 5 within grooves formed in the housing halves 1, 3. These grooves are seen at 16, 16' in FIG. 1.

Figure 6:
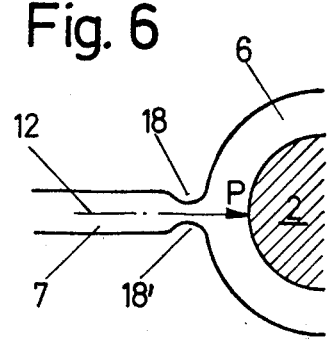
FIG. 6 is another embodiment illustrating a way to apply radially directed forces at the transition point between spindle seal portion and housing seal portion of the gasket.

The accumulation of material at the transition zones 8, 8', 9, 9' is preferably wedge-shaped (see FIG. 4). It is also possible, however, to utilize different configurations in order to provide the necessary bias forces on the sealing ring portion 6 surrounding spindle 2. The housing halves may also be so shaped that at the base, or root of the grooves 16, 16', in which the sealing gasket fits, accumulations 18, 18' are formed (for example by cutting the grooves more shallow at these positions, as seen in FIG. 6). When the housing halves 1, 3 are assembled together and clamped against each other, force P will be a resultant acting on the sealing gasket, that is, counter radial pressure from within the valve due to fluid carried by the valve. Again, reliable sealing of the spindle 2 throughout its circumference is obtained.

Accumulation of material, in the embodiment of FIG. 6, is obtained by making the grooves less deep in the regions 18, 18'; rather than changing the depth of the grooves, or, if desired, in addition thereto, the widths of the grooves can be locally decreased. A combination of accumulation of material on the sealing element, at the transition zone, combined with an accumulation of material in the housing, adjacent the transition zone, may likewise be used. Thus, the grooves in which the seal fits may, as seen in FIG. 4, be formed to have a lesser depth in the region of the transition zones 8, 8' than in the remainder of the length of the grooves, in order to obtain additional radially directed pressure against the spindle 2.

Small valves may not require a lower guide pin 17 (FIG. 1) for the globe, but can be directly suspended on a spindle. This, then, eliminates the necessity for the offset portion 18 in the gasket element (FIG. 2) and the housing sealing portion 7 may be formed entirely circular, except for the spindle sealing portion 6.

The sealing gasket according to the present invention has the advantage that increasing the quantity of material at specific and selected positions - in the transition zone between housing seal portion and spindle seal portion, a measurable bias force will obtain at these transition zones. The shape of the transition zone in the housing is preferably wedge-shaped. The bias forces provide for optimum sealing of the spindle, and uniform circumferential forces acting thereon. Fluid under pressure from within the valve housing thus is counteracted by pressure acting on the seal itself. This permits the construction of housings for various types of valves with different shapes of valve bodies, and constructing the housing to be separable, thus substantially decreasing the manufacturing costs, and permitting more economical manufacture of the housings, coupled with decreased accuracy requirements, and permitting higher tolerances.

The seal in accordance with the present invention permits manufacture of the housing halves without further working by molding, or injection casting or pressure casting techniques.

Various changes and modifications may be made within the scope of the inventive concept.

We claim:

1. In a separable valve cock having two half housings (1, 3), a valve member (4) movable in the housing and having an operating spindle (2) penetrating through the housing at the junction of the housing halves;

grooves (16, 16') formed at mating surfaces (12) of the housing halves, and a unitary sealing gasket (5) fitting in said grooves to seal the halves together and having an apertured neck portion (6) fitting about the spindle, a housing sealing portion (7) sealing the housing halves in the region surrounding the valve member, and a transition portion connecting the neck portion (6) and the housing sealing portion, the improvement wherein means are provided, including a bulge of material, to apply radial pressure inwardly toward the spindle at the transition zone between the neck portion (6) and the housing sealing portion (7) of the gasket to apply a bias force on the sealing gasket acting in a direction parallel to the plane of the mating surfaces (12) of the housing halves and in a direction (13) towards the spindle.

2. Valve cock according to claim 1, wherein the bulge of material is formed on the housing halves adjacent said transition zone.

3. Valve cock according to claim 1, wherein the pressure applying means comprises a zone of lesser size of the grooves, formed in the housing halves, adjacent said transition zone with respect to the remainder of the grooves to thereby provide said bulge of material in the grooves.

4. Valve cock according to claim 3, wherein the zone of lesser size of the grooves is a region of the grooves of lesser depths thereof.

5. Valve cock according to claim 3, wherein the zone of lesser size of the grooves is a zone of lesser widths of the groove.

6. Valve cock according to claim 1, wherein the pressure applying means comprises a zone of increased thickness of material of the sealing gasket adjacent said transition zone, with respect to the remainder of the sealing gasket.

7. Valve cock according to claim 1, wherein the pressure applying means further comprises a wedge-shaped surface formed in the housing halves facing the spindle opening adjacent said transition zone.

8. Valve cock according to claim 1, wherein the gasket has a quad-ring profile.

9. Sealing gasket to seal a valve cock as claimed in claim 1 having an apertured neck portion fitting about a valve spindle and a housing sealing portion sealing the housing halves of the valve cock surrounding the valve member wherein the transition zone between the neck portion and the housing sealing portion is formed with a thickened region, with respect to the remainder of the gasket, to apply a bias force on the sealing gasket acting in a direction parallel to the plane of the housing sealing portion of the gasket, and radially directed towards the spindle opening, when the gasket is assembled in the separable valve cock.

* * * * *